United States Patent
Ichihara et al.

(10) Patent No.: US 11,179,680 B2
(45) Date of Patent: Nov. 23, 2021

(54) CENTRIFUGAL FILTRATION DEVICE AND METHOD OF CAPTURING AND OBSERVING FINE PARTICLES IN LIQUID USING THE SAME

(71) Applicant: ORGANO CORPORATION, Tokyo (JP)

(72) Inventors: Fumitaka Ichihara, Tokyo (JP); Hiroshi Sugawara, Tokyo (JP)

(73) Assignee: ORGANO CORPORATION, Tokyo (JP)

(*) Notice: Subject to any disclaimer, the term of this patent is extended or adjusted under 35 U.S.C. 154(b) by 118 days.

(21) Appl. No.: 16/482,467

(22) PCT Filed: Jan. 10, 2018

(86) PCT No.: PCT/JP2018/000352
§ 371 (c)(1),
(2) Date: Jul. 31, 2019

(87) PCT Pub. No.: WO2018/142858
PCT Pub. Date: Aug. 9, 2018

(65) Prior Publication Data
US 2020/0003661 A1 Jan. 2, 2020

(30) Foreign Application Priority Data
Feb. 1, 2017 (JP) .............................. JP2017-016967

(51) Int. Cl.
*B04B 11/02* (2006.01)
*B04B 15/02* (2006.01)
(Continued)

(52) U.S. Cl.
CPC .............. *B01D 63/16* (2013.01); *B04B 11/02* (2013.01); *B04B 15/02* (2013.01); *B04B 3/00* (2013.01)

(58) Field of Classification Search
CPC .... B04B 3/00; B04B 7/00; B04B 7/16; B04B 11/00; B04B 11/08; B01D 63/16;
(Continued)

(56) References Cited

U.S. PATENT DOCUMENTS

2011/0309022 A1* 12/2011 Briggs ............... B01D 17/0202
210/663

FOREIGN PATENT DOCUMENTS

CN          2730485 Y  * 10/2005
JP          6-99165        4/1994
(Continued)

OTHER PUBLICATIONS

Official Communication issued in International Patent Application No. PCT/JP2018/000352, dated Mar. 6, 2018, and English language version thereof.
(Continued)

*Primary Examiner* — Waqaas Ali
(74) *Attorney, Agent, or Firm* — Greenblum & Bernstein, P.L.C.

(57) ABSTRACT

A centrifugal filtration device is provided. The centrifugal filtration device has filtration membrane that filtrates liquid; cartridge that supports filtration membrane and that forms liquid chamber together with filtration membrane, wherein liquid chamber holds the liquid therein; and rotating member that rotates around rotation center and that supports cartridge such that filtration membrane is positioned outward of liquid chamber with respect to rotation center. Rotating member has a path that is connected to liquid chamber, and at least a part of a liquid contact part of the path that is in contact with the liquid is formed of titanium or a titanium alloy.

14 Claims, 4 Drawing Sheets

(51) Int. Cl.
*B01D 63/16* (2006.01)
*B04B 3/00* (2006.01)

(58) Field of Classification Search
CPC ............ B01D 2315/08; B01D 2313/44; B01D 2315/02; C02F 1/44; C02F 1/38; C02F 2103/04; G01N 15/0227; G01N 2015/0053; G01N 15/0612; G01N 1/2035; G01N 1/4077; G01N 2001/4088; G01N 1/10
See application file for complete search history.

(56) References Cited

FOREIGN PATENT DOCUMENTS

| | | |
|---|---|---|
| JP | 2007-070126 A | 3/2007 |
| JP | 2016-55240 | 4/2016 |
| JP | 2016-064374 A | 4/2016 |
| KR | 10-2013-0098031 A | 9/2013 |

OTHER PUBLICATIONS

JIS K 0554$^{-1995}$ (cited in present specification at paragraph [003]) and partial English translation.

* cited by examiner

CENTRIFUGAL FILTRATION DEVICE AND METHOD OF CAPTURING AND OBSERVING FINE PARTICLES IN LIQUID USING THE SAME

TECHNICAL FIELD

The present invention is related to a centrifugal filtration device and a method of capturing and observing fine particles in liquid using the same, particularly to a liquid contact structure of a centrifugal filtration device.

BACKGROUND ART

In recent years, as semiconductor devices have become highly integrated, the line widths of the devices have become smaller. Thus, purer water quality has been required for pure water, ultrapure water and chemical liquids (organic solvents, such as isopropyl alcohol (IPA), propylene glycol monomethyl ether acetate (PGMEA), and the like) used in the field of semiconductor manufacturing. In particular, as for fine particles, which are believed to have a direct impact on yield, strict management is required both on particle diameter and on the concentration level. In recent years, the concentration level of fine particles is sometimes required to be equal to or lower than a prescribed value. The same applies to pure water and ultrapure water used in the field of manufacturing medicine.

As a method of detecting fine particles in pure water or ultrapure water, a direct microscopy method is known (see Japanese Industrial Standards, JIS K 0554-1995 "Method of Measuring Fine Particles in Ultrapure Water"). According to this method, pure water or ultrapure water is filtrated by a filtration membrane, particles are captured on the filtration membrane, and the fine particles are detected by means of an optical microscope or a scanning electron microscope. Fine particles having small particle diameters can be detected by a filtration membrane having a pore diameter that is smaller than the particle diameters of fine particles that are to be detected. However, it is desirable for the reliability of detection to capture as many fine particles as, or more fine particles than, fine particles contained in the filtration membrane itself, and in order to do so, it is necessary to supply a sufficient amount of pure water or ultrapure water to the filtration membrane. Further, as the particle diameter of fine particles to be detected becomes smaller, the pore diameter of the filtration membrane becomes smaller, and the pressure loss of the filtration membrane increases. For these reasons, detection of fine particles having small diameters requires a long filtration process.

When fine particles are detected by the direct microscopy method, a method is known in which a liquid, such as ultrapure water, is filtrated by means of a centrifugal filtration device (JP 2016-55240A). A filtration membrane is held by a cartridge. The cartridge and the filtration membrane form a liquid chamber that holds the liquid. A centrifugal force, which is exerted on the liquid in the liquid chamber toward the filtration membrane, increases the flow rate of the liquid that passes through the filtration membrane. Thus, the time required for filtration is shortened.

SUMMARY OF INVENTION

In order to capture and observe only fine particles present in a highly purified liquid, such as ultrapure water, it is necessary to prevent the generation of fine particles that come from the centrifugal filtration device. Electro-polished stainless steel is often used as a material for liquid contact parts. However, capturing fine particles in a highly purified liquid requires a long-time filtration process, and there is a possibility that fine particles that are generated from stainless steel are mixed with the liquid during that time. Such fine particles cannot be distinguished from fine particles that are originally contained in the liquid and affects the accuracy with which fine particles in the liquid are detected.

It is an object of the present invention to provide a centrifugal filtration device whose impact on accuracy when detecting fine particles in liquid is limited.

A centrifugal filtration device of the present invention comprises: a filtration membrane that filtrates liquid; a cartridge that supports the filtration membrane and that forms a liquid chamber together with the filtration membrane, wherein the liquid chamber holds the liquid therein; and a rotating member that rotates around a rotation center and that supports the cartridge such that the filtration membrane is positioned outward of the liquid chamber with respect to the rotation center. The rotating member has a path that is connected to the liquid chamber, and at least a part of a liquid contact part of the path that is in contact with the liquid is formed of titanium or a titanium alloy.

Titanium is more resistive to corrosion than stainless steel that has been conventionally used, and can keep the surface of the liquid contact part clean for a long time. Consequently, according to the present invention, it is possible to provide a centrifugal filtration device having limited impact on the accuracy with which fine particles in the liquid are detected.

Figure 1:
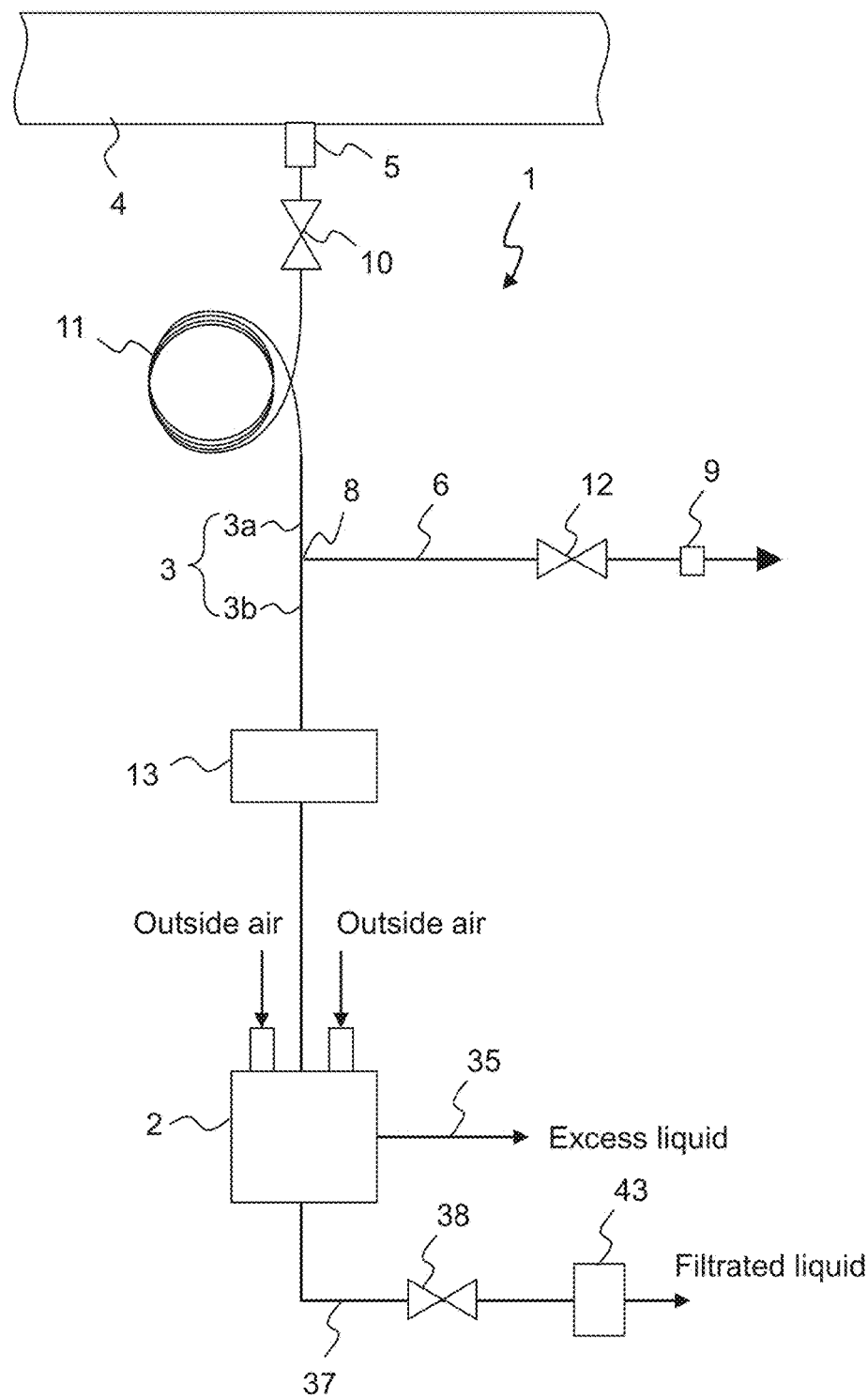
FIG. 1 is a schematic view generally illustrating a fine particle capturing device according to the present invention.

LIST OF REFERENCE NUMERALS 1 fine particle capturing device
2 centrifugal filtration device
14 rotating member
15 filtration device main body
16 chamber
18 casing
20 coupling rod (rotating means)
26 filtration membrane
27 liquid chamber
28 liquid supply path
29 liquid discharge path
30 excessive liquid discharge pipe
31 liquid supply pipe
44 cooling mechanism
45 space
51 first liquid contact part
52 second liquid contact part
53 third liquid contact part
54 fourth liquid contact part C rotation axis

DESCRIPTION OF EMBODIMENTS

Exemplary embodiments of a centrifugal filtration device of the present invention will be explained with reference to the drawings. The centrifugal filtration device of the present invention is preferably used for capturing fine particles that are contained in pure water or ultrapure water. For example, ultrapure water contains fine particles having a particle diameter of 50 nm or more at a ratio of less one per mL. The present invention is also applicable to the capturing of fine particles that are contained in liquids other than pure water and ultrapure water, such as fine particles contained in an organic solvent like IPA, PGMEA etc., fine particles contained in material of the organic solvent and fine particles contained in other liquids. In the following explanation, pure water, ultrapure water, an organic solvent and the like will be referred to as "liquid". The liquid may also be a material used for manufacturing an electronic component, a raw material thereof or an intermediate thereof.

FIG. 1 is a schematic drawing illustrating the general configuration of fine particle capturing device 1 according to the present invention, Fine particle capturing device 1 includes centrifugal filtration device 2. Centrifugal filtration device 2 receives liquid that contains fine particles and captures the fine particles contained in the liquid by means of filtration membranes 26 provided in centrifugal filtration device 2. Fine particle capturing device 1 includes liquid supply pipe 3 that supplies the liquid to centrifugal filtration device 2. Liquid supply pipe 3 is connected to process pipe 4 through which the liquid flows. The connection between process pipe 4 and liquid supply pipe 3 constitutes sampling point 5. Branch pipe 6 branches from liquid supply pipe 3 at branching point 8. Drain opening 9 is formed at the end of branch pipe 6, and the liquid is discharged to the outside of fine particle capturing device 1 through drain opening 9. Accordingly, the liquid can continuously flow through liquid supply pipe 3 and branch pipe 6. Liquid supply pipe 3 is connected to centrifugal filtration device 2 downstream of branching point 8. The liquid is supplied to liquid supply pipe 3 via sampling point 5. Then, a part of the liquid flows into centrifugal filtration device 2, and fine particles in the liquid are captured. The other part of liquid flows into branch pipe 6 and is discharged through drain opening 9. The section of liquid supply pipe 3 between sampling point 5 and branching point 8 will be referred to as upstream liquid supply pipe 3a, and the section of liquid supply pipe 3 between branching point 8 and the inlet of centrifugal filtration device 2 will be referred to as downstream liquid supply pipe 3b.

Upstream liquid supply pipe 3a has stop valve 10 provided downstream of sampling point 5. In the present embodiment, the liquid is continuously sampled for a certain period of time, and then filtration membranes 26 that are installed in centrifugal filtration device 2 are removed in order to detect fine particles. Accordingly, stop valve 10 remains open during the sampling of the liquid and is closed when the sampling of the liquid is completed.

Upstream liquid supply pipe 3a has depressurizing means 11 between stop valve 10 and branching point 8. Depressurizing means 11, which has a narrower path than upstream liquid supply pipe 3a, depressurizes the liquid by the throttling effect and the friction loss. A conduit having no movable parts is preferably used as depressurizing means 11. If a valve, such as a needle valve, is used for the depressurizing means, then fine particles, for example, of metal powder, are easily generated at sliding portions. The fine particles that are generated at the sliding portions are mixed with the liquid, and it is impossible to distinguish those fine particles from fine particles that are contained in the liquid at sampling point 5. It is therefore difficult for centrifugal filtration device 2 to capture only the fine particles that are contained in the liquid at sampling point 5. A conduit having no movable parts is less likely to generate fine particles, and enables centrifugal filtration device 2 to capture only the fine particles that are contained in the liquid at sampling point 5.

As depressurizing means 11, a conduit having a narrow path, such as an orifice, is preferably used, and a capillary tube is especially preferably used. The capillary tube may be wound multiple times, as illustrated, in order to prevent a rapid pressure drop. This ensures that the flow path has a sufficient length and prevents a rapid change in cross-sectional area of the flow path. In order to prevent the generation of fine particles, a capillary tube having a liquid contact part that is formed of perfluoroalkyl vinyl ether (PFA) resin is especially preferably used. The liquid contact part of the capillary tube may also be coated with PFA.

Flow rate adjusting mechanism 12 is provided on branch pipe 6. Flow rate adjusting mechanism 12 is preferably a valve. The flow rate of the liquid that flows through downstream liquid supply pipe 3b can be adjusted by adjusting the flow rate of the liquid that flows through branch pipe 6 by means of flow rate adjusting mechanism 12. This is because the flow rate of the liquid that is supplied to centrifugal filtration device 2 needs to be controlled, as explained later.

Downstream liquid supply pipe 3b has ultrasonic flowmeter 13. Ultrasonic flowmeter 13 is provided downstream of branching point 8 of liquid supply pipe 3. Ultrasonic flowmeter 13 does not have any component that protrudes into the flow path, and therefore prevents the generation of fine particles. The liquid contact part is formed of PFA in order to further prevent the generation of fine particles.

Figure 2:
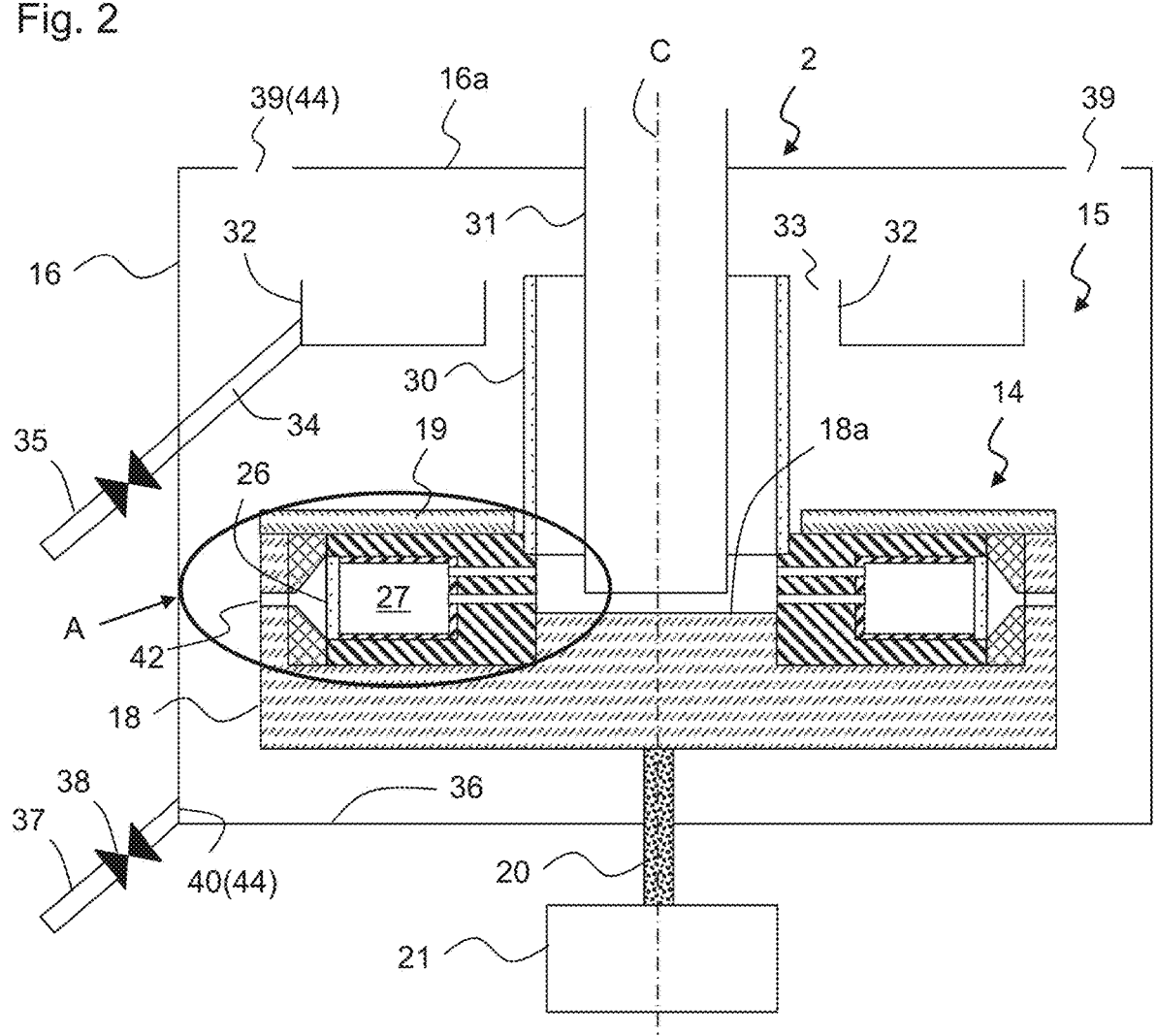
FIG. 2 is a schematic cross-sectional view of a centrifugal filtration device according to the present invention.
Figure 3:
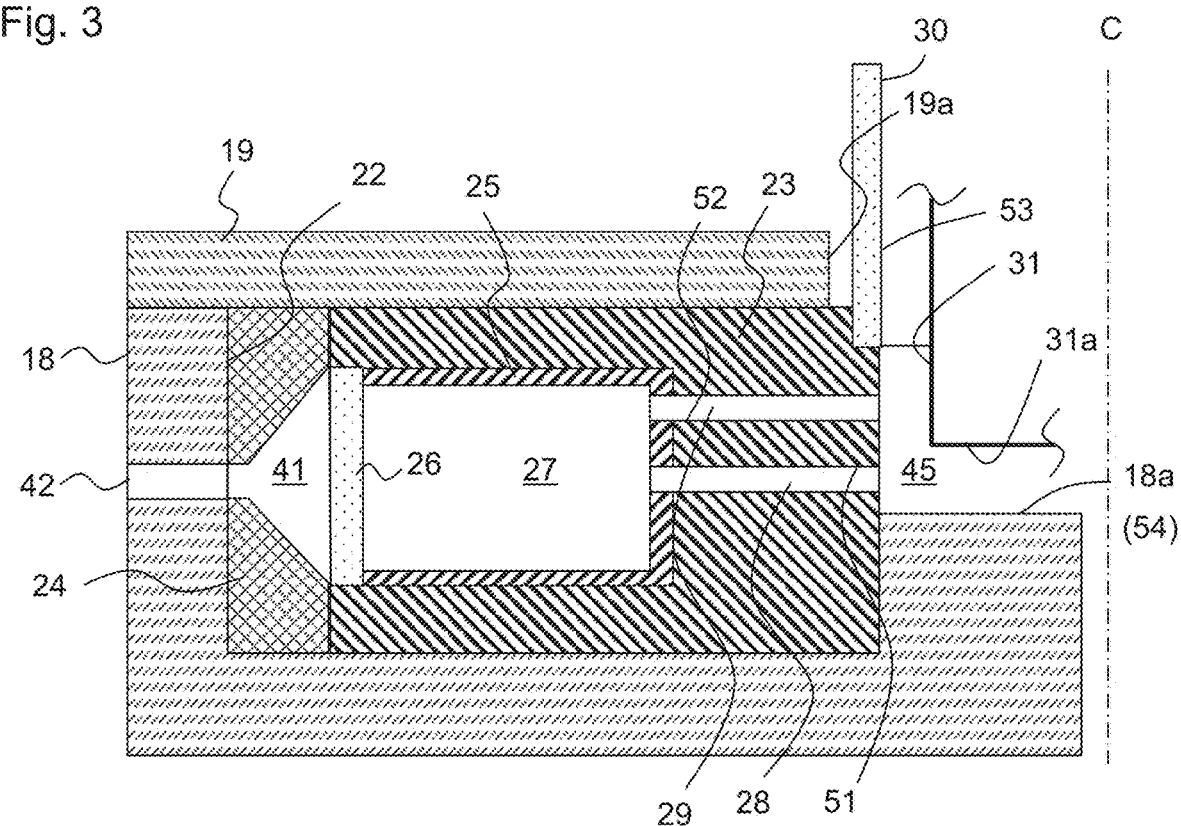
FIG. 3 is an enlarged view of part A in FIG. 2.

Referring to FIG. 2, centrifugal filtration device 2 includes filtration device main body 15 having rotating member 14; and chamber 16 that houses filtration device main body 15 therein. Rotating member 14 is rotatable around rotation axis (rotation center) C. FIG. 3 is an enlarged cross-sectional view of part A in FIG. 2. Rotating member 14 of filtration device main body 15 includes casing 18, casing cover 19 that covers the upper opening of casing 18, supporting members 23, outer members 24, cartridges 25 and filtration membranes 26. Casing 18 is coupled to coupling rod (rotating means) 20 that is coaxial with rotation axis C, and coupling rod 20 is coupled to motor 21. Accordingly, coupling rod 20 rotatably supports rotating member 14 that includes cartridges 25 and can rotate rotating member 14 at a certain rotational speed. Casing 18 and casing cover 19 define internal spaces 22 of filtration device main body 15.

Supporting members 23, outer members 24 and cartridges 25 are provided in internal spaces 22. Supporting member 23 supports cartridge 25. Outer member 24 defines the radial position of cartridge 25 and also forms radially outer space 41 of filtration membrane 26. Supporting members 23 are fitted with central protrusion 18a of casing 18. Filtration membrane 26 that filtrates the liquid is removably attached to cartridge 25. Filtration membrane 26 is positioned outward of liquid chamber 27 with respect to rotation axis C of coupling rod 20. Thus, when coupling rod 20 is rotated, the liquid in liquid chamber 27 is caused to flow in the radially outward direction, i.e., toward filtration membrane 26. Cartridge 25 not only supports filtration membrane 26, but also works together with filtration membrane 26 to form liquid chamber 27 where the liquid flows in and is held. It is desirable to use filtration membrane 26 after confirming that (blank) fine particles present on the membrane in the blank state (before sampling) will not impose an impact on evaluation and analysis results.

The average pore diameter of filtration membrane 26 is determined based on the particle diameter of the fine particles that are to be captured, and in general, the average pore diameter is selected from the range of 4 to 200 nm. When ultrapure water is used, a particle diameter of the order of 10 nm is preferably selected, and when chemical liquid, such as IPA, is used, a particle diameter of the order of 100 nm is preferably selected.

An anodic oxide film, a UF film, a track etched membrane and the like may be used for filtration membrane 26, and, in particular, an anodic oxide film is preferably used. An anodic oxide film is an oxide film that is generated on the surface of a metal when an electric current is applied to an electrolyte solution with the metal being used as an anode. Examples of anodic oxide films include an aluminum oxide coating film that is formed on the surface of aluminum. An anodic oxide film is preferably used for filtration membrane 26 having an average pore diameter of the order of 10 nm because of excellent permeability and high resistivity to organic solvents. When an anodic oxide film is used, the fine particles (blank particles) that are generated from filtration membrane 26 itself are made of inorganic aluminum oxide. In contrast, in ultrapure water manufacturing devices, liquid contacting components (joints, pipes, resin, UF membranes, etc.) that are in contact with liquid are generally formed of organic material. Furthermore, many components that are used in cleaning devices are made of Teflon (registered trademark) members (organic materials), such as PFA. Accordingly, by using an anodic oxide film, which is an inorganic film, as filtration membrane 26, it is possible to easily determine whether or not the components of the fine particles are organic in composition analysis. Consequently, it is possible to accurately measure and analyze impurities, in particular, organic matters, in a highly purified liquid that is used in the manufacturing of electronic components.

Liquid supply path 28 radially extends through cartridge 25 and supporting member 23. Discharge path 29 radially extends through cartridge 25 and supporting member 23 above liquid supply path 28. Two cartridges 25 are provided at an interval of 180 degrees, but the number and arrangement thereof are not limited to this Casing cover 19 has opening 19a that is formed in the central part thereof, and excess liquid discharge pipe 30 extends through opening 19a. Excess liquid discharge pipe 30 vertically extends along the inner circumference of supporting members 23 and coaxially with rotation axis C. Excess liquid discharge pipe 30 is connected to the outlet of discharge path 29 via space 45. Liquid supply pipe 31 vertically extends in the inside of excess liquid discharge pipe 30.

Liquid supply pipe 31 is connected to the inlet of liquid supply path 28 and with the outlet of discharge path 29 via space 45. As a result, liquid supply path 28 connects liquid chamber 27 to space 45 and supplies the liquid to liquid chamber 27. Discharge path 29 connects liquid chamber 27 to space 45 and supplies the liquid to space 45. Excess liquid discharge pipe 30 and liquid supply pipe 31 form a double tube.

In the present embodiment, rotating member 14 has paths that are connected to liquid chamber 27, and at least a part of liquid contact parts of the paths that are in contact with the liquid is formed of titanium or a titanium alloy. The paths are not limited as long as they are connected to liquid chamber 27, but the paths include liquid supply paths 28, discharge paths 29, excess liquid discharge pipe 30 and space 45. Specifically, at least one, preferably all, of the following parts are formed of titanium or a titanium alloy; first liquid contact parts 51 of liquid supply paths 28 that are in contact with the liquid; second liquid contact parts 52 of discharge paths 29 that are in contact with the liquid; third liquid contact part 53 of excess liquid discharge pipe 30 that is in contact with the liquid; and fourth liquid contact part 54 of casing 18 (central protrusion 18a of casing 18) that is in contact with the liquid. Second liquid contact parts 52 and third liquid contact part 53 are discharge paths for the liquid from cartridges 25, but there is a possibility that a part of the liquid recirculates to cartridges 25 from discharge paths 29 and excess liquid discharge pipe 30 through liquid supply paths 28. For this reason, these liquid contact parts 52, 53 are also preferably formed of titanium or a titanium alloy. First to fourth liquid contact parts 51 to 54 all are included in rotating member 14 that rotates around rotation axis C. Since rotating member 14 receives centrifugal force, rotating member 14 is preferably formed of a metal, where possible, from the standpoint of strength. Titanium and a titanium alloy have both strength against the centrifugal force and resistivity to pitting corrosion, explained later, and is preferably applied as a material used for the liquid contact parts of rotating member 14.

First to fourth liquid contact parts 51 to 54 are preferably formed of a titanium alloy that contains titanium at a ratio of 70% or more (mass %), more preferably of a titanium alloy that contains titanium at a ratio of 88% or more, and still more preferably of a titanium alloy that contains titanium at a ratio of 99% or more or of pure titanium. Examples of titanium alloys that contain titanium at a ratio of 70% or more and less than 88% include SSAT (registered trademark)—2041CF, which is a standardized product of Nippon Steel & Sumitomo Steel Corporation, and AMS 4914. Examples of titanium alloys that contain titanium at a ratio of 88% or more and less than 99% include α-β alloys JIS Grade 60 and Grade 61. Examples of titanium alloys that contain titanium at a ratio of 99% or more include anti-corrosion titanium alloys JIS Grades 11 to 13. Examples of pure titanium include pure titanium JIS Grades 1 to 4 and ASTM/ASTM Grades 1 to 4.

Titanium and titanium alloys are more resistive to pitting corrosion than stainless steel, "Pitting corrosion" means a corrosion that locally occurs on the surface of a metal and that develops in the depth direction from the surface. Titanium alloys that contain titanium at a ratio of 70% or more and pure titanium are less likely to generate pitting corrosion than stainless steel having a pitting corrosion index of 25 (e.g., SUS 316). In general, "the pitting corrosion index" is an index indicating the resistivity of stainless steel to pitting corrosion, and is defined here as "composition of Cr (%)+ 3.3×composition of Mo (%)". First to fourth liquid contact parts 51 to 54 do not necessarily have to be formed of titanium or a titanium alloy, and may be formed of any metal that is less likely to generate pitting corrosion than stainless steel having the above-defined pitting corrosion index of 25. The probability that pitting corrosion will not occur can be evaluated, for example, by generating pitting corrosion on the surfaces of metals under the same conditions except for material and by comparing the number of pitting corrosions generated per unit area. Supporting members 23 that constitutes first and second liquid contact parts 51 and 52, as well as excess liquid discharge pipe 30 that constitutes third liquid contact part 53, are formed of titanium or a titanium alloy as a whole, but it is also possible that only liquid contact parts 51 to 53 be formed of titanium or a titanium alloy. Casing 18 is formed of a metal, such as stainless steel, but fourth liquid contact part 54 is formed of titanium or a titanium alloy. In the present embodiment, outer members 24 and cartridges 25, which are liquid contact parts, are formed of PEEK (polyether ether ketone). Liquid supply pipe 31, which is also a liquid contact part, is formed of PFA. However, these members may also be formed of titanium or a titanium alloy.

Ultrapure water used in the manufacturing of semiconductors requires strict management not only on the diameter of particles but also on the number (the concentration) thereof. For this reason, in the measurement of fine particles by the direct microscopy method, it is desirable to reduce the number of blank particles present on a filtration membrane that is used, as well as the number of fine particles that will be generated from the liquid contact parts during the filtration and sampling operations. This is because fine particles that are contained in a liquid to be evaluated cannot be distinguished from the other fine particles when the particles are observed, measured and analyzed by means of a SEM or EDX. For this reason, when the particles are observed, measured and analyzed by means of these methods, especially when the composition analysis is performed by the EDX, it is important to minimize the number of fine particles that will be generated from the liquid contact parts.

As a result of the study by the inventors, it was found that as long as a measuring and analyzing technique that is required by conventional fine particle managing standards is used, a centrifugal filtration device having liquid contact parts made of stainless steel causes no major problems, but when a managing, measuring and analyzing technique for fine particles having smaller sizes and lower concentrations is required, it is difficult to perform an accurate measurement and analysis by means of a centrifugal filtration device that uses stainless steel for liquid contact parts 51 to 54 in, for example, supporting members 23. Specifically, it was found that a conventional supporting member made of stainless steel generates impurities (fine particles) that are very small in size and in amount and that the impurities that are captured by a filtration membrane during a sampling process impact the results of measurement and analysis performed thereafter by a SEM or EDX.

Titanium is more resistive to corrosion than stainless steel, and accordingly, can keep the surface of the liquid contact parts clean at a high level. Further, when the liquid is ultrapure water, a long sampling period of the order of day or month is required because ultrapure water contains only a small number of fine particles and because a filtration membrane having both a small pore diameter and a high pressure drop is required to capture fine particles of the order of 10 nm. For these reasons, when stainless steel is used for liquid contact parts 51 to 54, there is a possibility that fine particles of stainless steel will be generated during the sampling period and will be captured by filtration membrane 26. In contrast, the liquid contact parts of a titanium material are stable, and impurities (fine particles) are less likely to dissolve from the surface thereof even when sampling continues for a long time.

Further, organic solvents, such as IPA, are often supplied from a canister can made of stainless steel or from a supply device (a tank, a pipe, or a joint) made of stainless steel. Accordingly, there is a high possibility that fine particles that come from stainless steel (components) will be contained in the organic solvents. When a conventional device in which stainless steel is used for liquid contact parts of a centrifugal filtration device is used, it is impossible to determine whether fine particles composed of stainless steel come from the liquid (the supply system) or from the centrifugal filtration device (the evaluation system). For this reason, it is also preferable that the liquid contact parts be made of titanium or a titanium alloy when organic solvents are handled.

In the internal space of chamber 16, first reservoir 32 that collects excess liquid that is discharged from excess liquid discharge pipe 30 is provided. First reservoir 32 is an annular member that is positioned in the upper part of chamber 16, more specifically around the outlet of excess liquid discharge pipe 30. First reservoir 32 is supported by chamber 16 via a supporting member (not illustrated). Annular gap 33 is formed between first reservoir 32 and the outlet of excess liquid discharge pipe 30. Due to this arrangement, the interference between excess liquid discharge pipe 30, which is a part of rotating member 14, and first reservoir 32, which is an unrotatable and fixed member in chamber 16, can be prevented. Excess liquid discharge path 34 extends in a slant and downward direction from the radially outer edge of the bottom of first reservoir 32. Excess liquid discharge path 34 extends through chamber 16 and is connected to excess liquid discharge pipe 35 that extends outside of chamber 16.

In the internal space of chamber 16, second reservoir 36 that collects filtrated liquid that passes through filtration membrane 26 and that discharges the collected liquid to second outer communication hole 40 (explained later) is provided. Second reservoir 36 is positioned on and formed by the bottom of chamber 16. Filtrated liquid discharge pipes 37 are used for discharging the filtrated liquid that accumulates in second reservoir 36 and extend in a slant and downward direction from the bottom of chamber 16. Filtrated liquid discharge pipes 37 extend through chamber 16 to the outside of chamber 16. A valve that functions as pressure adjusting means 38 and integrated flowmeter 43 are provided on filtrated liquid discharge pipe 37.

Chamber 16 has first outer communication holes 39 that are positioned above rotating member 14 and that are connected to the outside of chamber 16, as well as second outer communication holes 40 that are positioned below rotating member 14 and that are connected to the outside of chamber 16. These communication holes 39, 40 form cooling mechanism 44 that cools the liquid in the rotating member before the liquid is filtrated by the filtration membranes. First outer communication holes 39 may be provided, for example, in upper lid 16a of chamber 16. Second outer communication holes 40 are provided at the radially outer edge of the bottom of chamber 16. First outer communication holes 39 are positioned radially inward of second outer communication holes 40 with respect to rotation axis C. In other words, second outer communication holes 40 are positioned radially outward of first outer communication holes 39 with respect to the radial direction of rotating member 14. The numbers of first and second outer communication holes 39, 40 are not limited, but first and second outer communication holes 39, 40 are preferably distributed as uniformly as possible in order to effectively ventilate the inside of chamber 16. For example, first and second outer communication holes 39, 40 may be arranged at four locations at an interval of 90 degrees, respectively. First outer communication holes 39 are open to the outside air or to the outside atmosphere. Second outer communication holes 40 can be open to the outside air or to the outside atmosphere by opening valve 38 and are open to the outside air or to the outside atmosphere when centrifugal filtration device 2 is in operation.

Centrifugal filtration device 2 operates in the following manner. First, motor 21 is activated to rotate rotating member 14 via coupling rod 20, which is the rotating means. Stop valve 10 is opened, the liquid then flows into upstream liquid supply pipe 3a from sampling point 5, and a part of the liquid flows into downstream liquid supply pipe 3b through branching point 8. The liquid is supplied in the vertically downward direction by liquid supply pipe 31 that is connected to downstream liquid supply pipe 3b, reaches the top face of central protrusion 18a of rotating casing 18 and is supplied into space 45. The liquid flows into liquid supply paths 28 on both sides due to the centrifugal force and is supplied to liquid chambers 27. The liquid is pressed against filtration membranes 26 by the centrifugal force and is filtrated by filtration membranes 26. The liquid reaches radially outer spaces 41 of filtration membrane 26 as filtrated liquid, and is discharged from drain ports 42 that are formed in outer members 24 and casing 18. The filtrated liquid falls within chamber 16 to second reservoir 36. The filtrated liquid is directed to filtrated liquid discharge pipes 37 through second outer communication holes 40. Valves 38 of filtrated liquid discharge pipes 37 are open while centrifugal filtration device 2 is in operation, and the filtrated liquid is discharged to the outside of the system through filtrated liquid discharge pipes 37. Integrated flowmeter 43 on filtrated liquid discharge pipe 37 measures an integrated flow rate of the filtrated liquid.

Due to the pressure loss of filtration membranes 26, most of the liquid flows into discharge paths 29 as excess liquid and is discharged into space 45. A part of the excess liquid flows into liquid supply paths 28 again from space 45 and the other part flows upward along the inner wall surface of rotating excess liquid discharge pipe 30. When the excess liquid reaches the upper end of excess liquid discharge pipe 30, the excess liquid is scattered radially outward due to the centrifugal force and is collected by first reservoir 32. The excess liquid that is collected is discharged to the outside of chamber 16 through excess liquid discharge path 34 and excess liquid discharge pipe 35.

After centrifugal filtration device 2 is operated for a certain period of time, the operation of centrifugal filtration device 2 is stopped, stop valve 10 is then closed, and filtration membranes 26 are removed, Specifically, upper lid 16a of chamber 16, liquid supply pipe 31, excess liquid discharge pipe 30 and casing cover 19 are removed, and outer members 24, supporting members 23 and cartridges 25 are removed from internal spaces 22 of casing 18. Filtration membranes 26 are removed from cartridges 25, and the number, the diameter etc. of the fine particles that are captured on the membrane surfaces of filtration membranes 26 are observed by means of a fine particle detecting device, such as an optical microscope, a scanning electron microscope, a transmission electron microscope or an atomic force microscope, or by implementing a method, such as energy dispersive X-ray spectroscopy, electron energy-loss spectroscopy or X-ray photoelectron spectroscopy. Based on the amount of the filtrated liquid that is measured by integrated flowmeter 43, the number, the particle diameter distribution etc. of the fine particles that are contained in the liquid per unit volume can be calculated.

As explained above, first outer communication holes 39 are provided above rotating member 14 in chamber 16, and second outer communication holes 40 are provided below rotating member 14 and radially outward of first outer communication holes 39 in chamber 16, The temperature of liquid chambers 27 of centrifugal filtration device 2 gradually rises due to various causes, such as heat generated by motor 21 and bearings (not illustrated) and frictional heat generated between rotating member 14 that rotates at a high speed and air in chamber 16. When the liquid contains live bacteria, the live bacteria may adhere to filtration membranes 26 and may proliferate. In order to prevent the accuracy with which the fine particles are detected from worsening because of this situation, it is desirable that the temperature of liquid chambers 27 be maintained as constant as possible. In the present embodiment, a ventilation flow is formed in chamber 16 by the air that is introduced into chamber 16 through first outer communication holes 39 and that is discharged through second outer communication holes 40. Accordingly, chamber 16, as well as liquid chambers 27 and the liquid that is held in liquid chambers 27, is cooled, and a rise of the temperature can be prevented.

The rotation of rotating member 14 causes an air flow from the radially inner side toward the radially outer side with respect to rotation axis C near rotating member 14 in chamber 16. Due to the air flow, the closer to the radially inner side of the chamber with respect to rotation axis C is a position, the greater is the increase of the negative pressure at the position, and the closer to the radially outer side of the chamber is a position, the greater is the decrease of the negative pressure at the position. Since first outer communication holes 39 are positioned inward of second outer communication holes 40 with respect to the radial direction of rotating member 14, the outside air flows in through first outer communication holes 39 having a low pressure and flows out through second outer communication holes 40 having a high pressure. Due to this air flow, the air in chamber 16 is constantly replaced with the outside air, and the internal space of chamber 16 is ventilated. Because the air flow is generated by natural ventilation, there is no need to use a pump for forming air flow, and there is no need to use compressed air. Consequently, it is possible to achieve a desired cooling effect by a simple configuration.

In another embodiment, cooling gas other than air, such as nitrogen gas, may be introduced into chamber 16, Specifically, supply pipes for nitrogen gas are connected to first outer communication holes 39, and nitrogen gas is supplied to chamber 16 from a nitrogen gas tank via the supply pipes. In this case, there also is no need to use high pressure gas because chamber 16 is under negative pressure. When internal components of centrifugal filtration device 2 are formed of metal, the components may corrode due to oxygen in the air. In particular, central protrusion 18a of casing 18 tends to easily corrode when it comes into contact with the air that flows downward in excess liquid discharge pipe 30. By introducing an inert gas, such as nitrogen gas, to chamber 16, it is possible to cool chamber 16 while preventing the corrosion of the internal components.

In centrifugal filtration device 2, it is necessary to discharge the excess liquid without it being mixed with the filtrated liquid. Most of the liquid that is supplied to centrifugal filtration device 2 becomes excess liquid, and only a very small amount of the liquid is filtrated. Therefore, even if a very small amount of excess liquid is mixed with the filtrated liquid, it is difficult for integrated flowmeter 43 to accurately measure the flow rate of the filtrated liquid, and accuracy with which the concentration of the fine particles is calculated will worsen.

The mixture of excess liquid with the filtrated liquid occurs when the excess liquid is not properly discharged. This is caused by the leakage of excess liquid from excess liquid discharge pipe 30. Because of the rotation of rotating member 14 in chamber 16, the pressure in chamber 16 is not uniform, and a complex pressure distribution is formed in chamber 16. In particular, when the natural ventilation is generated by first outer communication holes 39 and second outer communication holes 40, a complex air flow is formed in chamber 16, In addition, the disturbance of the air flow in chamber 16 may occur by a modification to the inner arrangement of the filtration device, such as providing a step on the bottom of chamber 16 for easily collecting the filtrated liquid at second outer communication holes 39 and thereby accurately measuring the amount of the filtrated liquid. Depending on the state of the air flow, the excess liquid that is discharged through excess liquid discharge pipe 30 may not reach first reservoir 32 with the centrifugal force and may fall through gap 33 that is formed between first reservoir 32 and excess liquid discharge pipe 30 and may be collected in second reservoir 36 that is provided on the bottom of chamber 16.

In the present embodiment, by adjusting the opening degree of pressure adjusting means 38, it is possible to adjust the pressure distribution, as well as the state of the air flow in chamber 16, and thereby to prevent the excess liquid from being mixed with the filtrated liquid. As explained above, the air flow in chamber 16 is disturbed even by a modification to the inner arrangement of the filtration device. The air flow in the chamber must have an appropriate strength that allows the excess liquid, which is discharged from excess liquid discharge pipe 30, to reach first reservoir 32 with the aid of the centrifugal force. The state of the air flow depends on the internal structure of the filtration device. Therefore, when the air flow is too strong or too weak, the excess liquid may fall through gap 33 that is formed between first reservoir 32 and excess liquid discharge pipe 30 and may be collected by second reservoir 36 that is provided on the bottom of chamber 16. When the air flow is too strong, the air flow toward filtrated liquid discharge pipe 37 is weakened by narrowing the opening degree of pressure adjusting means 38, and when the air flow is too weak, the air flow toward filtrated liquid discharge pipe 37 is strengthened by increasing the opening degree of pressure adjusting means 38.

It is important to control the amount of the excess liquid in order to prevent the excess liquid from being mixed with the filtrated liquid, and for that purpose, it is necessary to limit the flow rate of the liquid that flows through liquid supply pipe 3. The flow rate is in proportion to pressure. Therefore, when the liquid that is supplied at sampling point 5 is at a high pressure, the flow rate of the liquid that is supplied to centrifugal filtration device 2 will increase.

In the present embodiment, the flow rate of the liquid that is supplied to centrifugal filtration device 2 can be limited by means of depressurizing means 11 (the capillary tube) of liquid supply pipe 3. In many facilities where pure water or ultrapure water is handled, the pressure of pure water or ultrapure water (the pressure at sampling point 5) is in the range of 0.2 to 0.3 MPa, but, in some cases, it may be around 0.7 MPa. Accordingly, the flow rate of the liquid that is supplied to centrifugal filtration device 2 can be properly controlled by adjusting the inner diameter and the length of the capillary tube in accordance with the pressure at sampling point 5. When the pressure at sampling point 5 is sufficiently low, depressurizing means 11 may be omitted.

In order to ensure the accuracy with which the concentration of the fine particles is calculated, it is important not only to control the flow rate of the liquid that is supplied, but also to prevent the generation of additional fine particles.

The simplest way to control the flow rate is to use a valve which acts as depressurizing means 11 of liquid supply pipe 3. However, a valve has sliding parts, and fine particles that are generated by the sliding movements may be mixed into the liquid. It is necessary to capture only the fine particles that are contained at sampling point 5 by means of centrifugal filtration device 2 in order to accurately detect the concentration of the fine particles. In the present embodiment, because depressurizing means 11 is made of a capillary tube, the generation of fine particles can be prevented.

As explained above, a filtration membrane that captures fine particles, for example, of the order of nanometers, has very fine pores, allows only a small amount of water to passes therethrough, and most of the liquid becomes excess liquid. Therefore, the balance between the amount of the excess liquid that is stored in first reservoir 32 and the amount of the excess liquid that is discharged from excess liquid discharge path 34 may be disturbed, and the excess liquid may overflow from first reservoir 32 and may be collected by second reservoir 36 that is provided on the bottom of chamber 16. It is therefore important to control the flow rate of the liquid that flows through downstream liquid supply pipe $3b$. In order to control the flow rate of the liquid more accurately, fine particle capturing device 1 of the present embodiment includes branch pipe 6 having flow rate adjusting mechanism 12. The ratio of the flow rate of the liquid that flows through downstream liquid supply pipe $3b$ to that of the liquid that flows through branch pipe 6 can be accurately controlled by means of flow rate adjusting mechanism 12. As mentioned above, flow rate adjusting mechanism 12 is preferably a valve. Fine particles that may be generated by flow rate adjusting mechanism 12 flow toward discharge opening 9 along the flow in branch pipe 6, and the possibility that the fine particles flow back to branching point 8 between liquid supply pipe 3 and branch pipe 6 is low. Consequently, it is possible not only to supply the liquid to downstream liquid supply pipe $3b$ at a desired flow rate, but also to prevent unnecessary fine particles that may be generated by flow rate adjusting mechanism 12 from flowing into centrifugal filtration device 2. Because a common flow rate adjusting valve can be used as flow rate adjusting mechanism 12, cost can be reduced.

Branch pipe 6 having drain opening 9 prevents the liquid from staying in fine particle capturing device 1, Because the water that flows through branch pipe 6 is continuously discharged from drain opening 9, the liquid in fine particle capturing device 1 can be constantly maintained at a state similar to the state at sampling point 5.

The flow rate of the liquid that is supplied to centrifugal filtration device 2 can be more accurately controlled by the combination of ultrasonic flowmeter 13 and flow rate adjusting mechanism 12. Specifically, a desirable flow rate can be stably maintained by measuring the flow rate of the liquid that is supplied to centrifugal filtration device 2 by means of ultrasonic flowmeter 13 and by adjusting the opening degree of flow rate adjusting mechanism 12 in accordance with the measurement. Because the liquid contact part of ultrasonic flowmeter 13 is coated with PFA, the generation of additional fine particles can also be prevented.

In the embodiment described above, chamber 16 includes first outer communication holes 39 and second outer communication holes 40 as cooling mechanism 44. However, as long as the filtrated liquid can be cooled, cooling mechanism 44 is not limited to the above-mentioned embodiment. For example, it is possible to install the centrifugal filtration device in a temperature-controllable cooling device in order to cool the device itself and thereby to indirectly cool the filtrated liquid. Alternatively, it is also possible to directly cool the filtrated liquid by means of a heat exchanger in which cold water circulates. Alternatively, it is also possible to provide a cold water source outside of the chamber and to provide a pipe that is connected to the cold water source in the chamber and thereby to indirectly cool the filtrated liquid.

Example

Ultrapure water was supplied to a centrifugal filtration device having first to fourth liquid contact parts 51 to 54 that are formed of a titanium alloy, and fine particles having particle diameters of 10 nm or more present in the ultrapure water were captured (sampled) by means of a filtration membrane. An anodic oxide film (pore diameter: 10 nm) was used as the filtration membrane. After the sampling process had been performed for approximately one month, the filtration membrane was taken out of the centrifugal filtration device, and the fine particles that were captured on the membrane surface were observed, measured and analyzed by means of a SEM and EDX. Further, as a comparative example, fine particles having particle diameters of 10 nm or more present in the same ultrapure water were captured (sampled) by a filtration membrane in the same manner as the example by means of a centrifugal filtration device having the same configuration except that the liquid contact parts are formed of electrolytically-polished stainless steel, and the captured fine particles were observed, measured and analyzed by means of a SEM and EDX.

Figure 4:
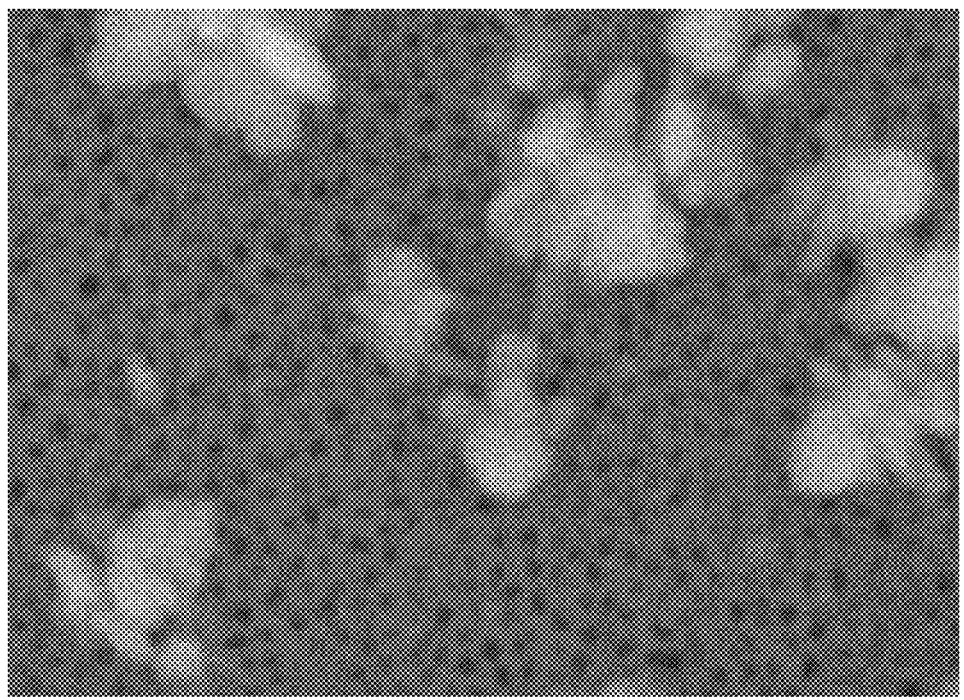
FIG. 4 is a SEM image of crystalline particles captured by a filtration membrane according to a comparative example.
Figure 5:
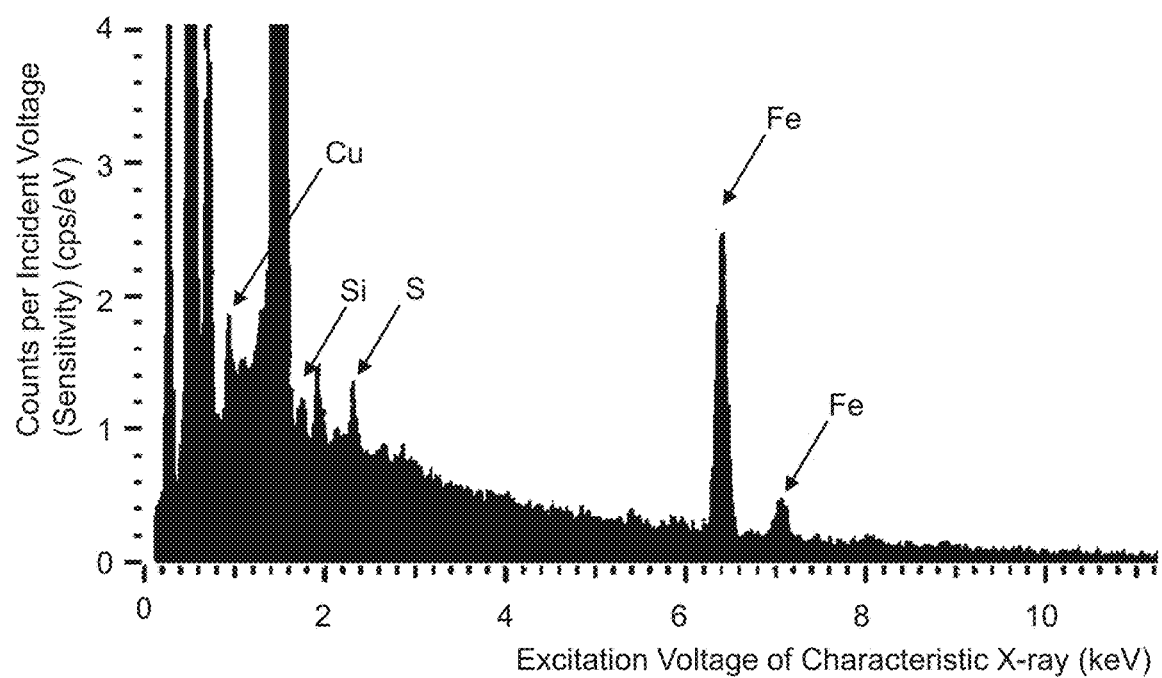
FIG. 5 shows a result of an EDX composition analysis on fine particles captured by the filtration membrane according to the comparative example.

In the example, the number of fine particles having particle diameters of 10 nm or more was 6/mL. In the comparative example, the number of fine particles was 34/mL. In the comparative example, crystalline fine particles, such as those shown in FIG. 4, were detected, but, in the example, such fine particles were not detected. As a result of composition analysis on the crystalline fine particles performed by EDX, it was found that a main component of the fine particles was iron (Fe), as shown in FIG. 5. From these results, many fine particles composed of stainless steel were observed in the conventional centrifugal filtration device having liquid contact parts made of stainless steel, and in contrast, only a few fine particles composed of stainless steel were observed in the centrifugal filtration device having liquid contact parts made of titanium, and thus the evaluation and the analysis were more accurate. No elution of titanium fine particles was observed in the liquid contact parts made of titanium.

The invention claimed is:

1. A centrifugal filtration device comprising:
a filtration membrane that filtrates liquid;
a cartridge that supports the filtration membrane and that forms a liquid chamber together with the filtration membrane, wherein the liquid chamber holds the liquid therein; and
a rotating member that rotates around a rotation center and that supports the cartridge such that the filtration membrane is positioned outward of the liquid chamber with respect to the rotation center, wherein
the rotating member includes;
a liquid supply path that supplies the liquid to the liquid chamber;
a liquid discharge path that is connected to the liquid supply path via space and that discharges the liquid in the liquid chamber; and
a liquid discharge pipe that is connected to the liquid supply path via the space and that forms a discharge path for the liquid that is discharged from the liquid discharge path; and
a first liquid contact part of the liquid supply path that is in contact with the liquid, a second liquid contact part of the liquid discharge path that is in contact with the liquid and a third liquid contact part of the liquid discharge pipe that is in contact with the liquid are formed of titanium or a titanium alloy wherein the filtration membrane is an anodic oxide film.

2. The centrifugal filtration device according to claim 1, wherein
the rotating member includes a supporting member that supports the cartridge, a liquid supply pipe that is positioned with a space interposed between the liquid supply pipe and the supporting member and that supplies the liquid to the space, and a liquid discharge pipe that is fixed to the supporting member outward of the liquid supply pipe and that forms the discharge path for the liquid between the liquid supply pipe and the liquid discharge pipe,
the supporting member includes the liquid supply path and the liquid discharge path, wherein the liquid supply path connects the liquid chamber to the space and supplies the liquid to the liquid chamber, and the liquid discharge path connects the liquid chamber to the space and discharges the liquid in the liquid chamber to the space, and a fourth liquid contact part of the supporting member that faces the space is formed of titanium or a titanium alloy.

3. The centrifugal filtration device according to claim 2, wherein the first to fourth liquid contact parts are formed of a titanium alloy that contains titanium at a ratio of 70% or more.

4. The centrifugal filtration device according to claim 2, wherein the first to fourth liquid contact parts are formed of a titanium alloy that contains titanium at a ratio of 88% or more.

5. The centrifugal filtration device according to claim 2, wherein the first to fourth liquid contact parts are formed of a titanium alloy that contains titanium at a ratio of 99% or more or of a pure titanium.

6. A centrifugal filtration device comprising:
a filtration membrane that filtrates liquid;
a cartridge that supports the filtration membrane and that forms a liquid chamber together with the filtration membrane, wherein the liquid chamber holds the liquid therein; and
a rotating member that rotates around a rotation center and that supports the cartridge such that the filtration membrane is positioned outward of the liquid chamber with respect to the rotation center, wherein
the rotating member includes:
a liquid supply path that supplies the liquid to the liquid chamber
a liquid discharge path that is connected to the liquid supply path via space and that discharges the liquid in the liquid chamber; and
a liquid discharge pipe that is connected to the liquid supply path via the space and that forms a discharge path for the liquid that is discharged from the liquid discharge path; and
a first liquid contact part of the liquid supply path that is in contact with the liquid, a second liquid contact part of the liquid discharge path that is in contact with the liquid and a third liquid contact part of the liquid discharge pipe that is in contact with the liquid are formed of a metal that is more resistive to pitting corrosion than stainless steel having a pitting corrosion index of 25 wherein the infiltration membrane is an anodic oxide film.

7. The centrifugal filtration device according to claim 6, wherein the rotating member includes a supporting member that supports the cartridge, a liquid supply pipe that is positioned with a space interposed between the liquid supply pipe and the supporting member and that supplies the liquid to the space, and a liquid discharge pipe that is fixed to the supporting member outward of the liquid supply pipe and that forms the discharge path for the liquid between the liquid supply pipe and the liquid discharge pipe, the supporting member includes the liquid supply path and the liquid discharge path, wherein the liquid supply path connects the liquid chamber to the space and supplies the liquid to the liquid chamber, and the liquid discharge path connects the liquid chamber to the space and discharges the liquid in the liquid chamber to the space, and a fourth liquid contact part of the supporting member that faces the space is formed of titanium or a titanium alloy.

8. A method of capturing and observing fine particles in liquid, the method comprising:

capturing the fine particles in the liquid on a membrane surface of the filtration membrane by means of the centrifugal filtration device according to claim 1, and observing the fine particles.

9. The method of capturing and observing fine particles in liquid according to claim 8, wherein the fine particles are observed by means of one selected from among an optical microscope, a scanning electron microscope, a transmission electron microscope and an atomic force microscope; or by implementing one selected from among energy dispersive X-ray spectroscopy, electron energy-loss spectroscopy and X-ray photoelectron spectroscopy.

10. The method of capturing and observing fine particles in liquid according to claim 8, wherein the liquid is a material, a raw material thereof or a reaction intermediate thereof, wherein the material is used for manufacturing an electronic component.

11. The centrifugal filtration device according to claim 1, wherein the filtration membrane captures fine particles of an order of 10 nm.

12. A centrifugal filtration device, wherein a filtration membrane that filtrates liquid can be installed on the centrifugal filtration device, the centrifugal filtration device comprising:

a cartridge that supports the filtration membrane and that forms a liquid chamber together with the filtration membrane, wherein the liquid chamber holds the liquid therein; and a rotating member that rotates around a rotation center and that supports the cartridge such that the filtration membrane is positioned outward of the liquid chamber with respect to the rotation center, wherein the rotating member includes:

a liquid supply path that supplies the liquid to the liquid chamber a liquid discharge path that is connected to the liquid chamber via space and that discharges the liquid in the liquid chamber; and a liquid discharge pipe that is connected to the liquid chamber via the space and that forms a discharge path for the liquid that is discharged from the liquid discharge path; and a first liquid contact part of the liquid supply path that is in contact with the liquid, a second liquid contact part of the liquid discharge path that is in contact with the liquid and a third liquid contact part of the liquid discharge pipe that is in contact with the liquid are formed of titanium or a titanium alloy wherein the filtration membrane is an anodic oxide film.

13. A centrifugal filtration device, wherein a filtration membrane that filtrates liquid can be installed on the centrifugal filtration device, the centrifugal filtration device comprising:

a filtration membrane that filtrates liquid;

a cartridge that supports the filtration membrane and that forms a liquid chamber together with the filtration membrane, wherein the liquid chamber holds the liquid therein; and a rotating member that rotates around a rotation center and that supports the cartridge such that the filtration membrane is positioned outward of the liquid chamber with respect to the rotation center, wherein the rotating member includes;

a liquid supply path that supplies the liquid to the liquid chamber a liquid discharge path that is connected to the liquid chamber via space and that discharges the liquid in the liquid chamber; and a liquid discharge pipe that is connected to the liquid chamber via the space and that forms a discharge path for the liquid that is discharged from the liquid discharge path; and a first liquid contact part of the liquid supply path that is in contact with the liquid, a second liquid contact part of the liquid discharge path that is in contact with the liquid and a third liquid contact part of the liquid discharge pipe that is in contact with the liquid are formed of a metal that is more resistive to pitting corrosion than stainless steel having a pitting corrosion index of 25 wherein the filtration membrane is an anodic oxide film.

14. The centrifugal filtration device according to claim 1, wherein a part of the liquid recirculates to the cartridge from the liquid discharge path and the liquid discharge pipe through the liquid supply path.

* * * * *